United States Patent
Kurnik

(10) Patent No.: US 7,321,914 B2
(45) Date of Patent: Jan. 22, 2008

(54) FAST METHOD FOR CALCULATING POWERS OF TWO AS A FLOATING POINT DATA TYPE

(75) Inventor: James T. Kurnik, Linden, MI (US)

(73) Assignee: General Motors Corporation, Detroit, MI (US)

( * ) Notice: Subject to any disclaimer, the term of this patent is extended or adjusted under 35 U.S.C. 154(b) by 750 days.

(21) Appl. No.: 10/781,429

(22) Filed: Feb. 18, 2004

(65) Prior Publication Data

US 2005/0182810 A1    Aug. 18, 2005

(51) Int. Cl.
*G06B 7/483*    (2006.01)
(52) U.S. Cl. .................................... 708/495
(58) Field of Classification Search ................ 708/495
See application file for complete search history.

(56) References Cited

U.S. PATENT DOCUMENTS

| | | | |
|---|---|---|---|
| 5,200,916 A | 4/1993 | Yoshida | 364/748 |
| 5,974,432 A | 10/1999 | Orup | 708/205 |
| 2002/0194239 A1* | 12/2002 | Pangal | 708/498 |
| 2003/0005015 A1 | 1/2003 | Chen | 708/520 |
| 2003/0028572 A1 | 2/2003 | Hoskote et al. | 708/495 |
| 2003/0200244 A1* | 10/2003 | Abraham et al. | 708/495 |

OTHER PUBLICATIONS

Bill Venners, "Floating-point arithmetic", Oct. 14, 2003 JavaWorld.com, an IDG company, http://www.javaworld.com/javaworld/jw-10-1996/jw-10-hood_p.html, pp. 1-8.
Steve Hollasch, "IEEE Standard 754 Floating Point Numbers", http://www.research.microsoft.com/~hollasch/cgindex/coding/ieeefloat.html, Jan. 2, 2003, pp. 1-8.

* cited by examiner

*Primary Examiner*—D. H. Malzahn

(57) ABSTRACT

A computing system is adapted to calculate an exponent portion of a floating point data type, and is preferably employed in calculating powers of two in a computer language processing environment supporting a union declaration functionality and a left shift functionality. Accordingly, an input receives an exponent value, and a bias application module biases the exponent value based on a selected precision of a floating point data type. Also, a storage module stores the exponent value in a storage variable having a size determined based on the selected precision. Further, a left shift application module shifts the exponent value left by a number of bits determined based on the selected precision. Finally, an output returns the storage variable as the floating point data type having the selected precision.

20 Claims, 2 Drawing Sheets

FAST METHOD FOR CALCULATING POWERS OF TWO AS A FLOATING POINT DATA TYPE

FIELD OF THE INVENTION

The present invention generally relates to mathematical calculations in a processor, and relates in particular to exponent calculation as a floating point data type in a computer language processing environment supporting a union declaration functionality and a left shift functionality.

BACKGROUND OF THE INVENTION

In today's embedded controller software, an often used calculation involves creating a power of two ($2^N$ where N is an integer) for use in various computations. In binary fixed point math, the power of two may be constructed by shifting a "1" in a microprocessor register to the left by a number of bits corresponding to the magnitude of the exponent. However, such a shift does not achieve the same results in floating point math. Therefore, creating a power of two in floating point math typically requires loading a register with a value of "1" and then shifting it the requisite amount to create the power of two as an integer value. This value must then be converted to a floating point type for use in subsequent calculations. This operation is a lengthy one that consumes many processor cycles, which is undesirable in a real-time, embedded processor application.

SUMMARY OF THE INVENTION

In accordance with the present invention, a computing system is adapted to calculate an exponent portion of a floating point data type, and is preferably employed in calculating powers of two in a computer language processing environment supporting a union declaration functionality and a left shift functionality. Accordingly, an input receives an exponent value, and a bias application module biases the exponent value based on a selected precision of a floating point data type. Also, a storage module stores the exponent value in a storage variable having a size determined based on the selected precision. Further, a left shift application module shifts the storage variable left by a number of bits determined based on the selected precision. Finally, an output returns the storage variable as the floating point data type having the selected precision.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention provides a technique for computing the exponent portion of a floating point data type that avoids the computational expense of converting an integer data type to a floating point data type. One skilled in the art will readily recognize that the characteristics of floating point data types typically conform to the ANSI/IEEE Standard 754-1985, and the preferred embodiment detailed herein operates in conformance with this standard. It should be readily understood, however, that standards may change with time, and also that some computer languages do not conform with all standards. It is therefore envisioned that the system and method of the present invention may be modified to conform with new standards. It is further envisioned that modifications may be made to accommodate deviations from standards for floating point data types, standards for other primitive data types, and techniques of functions operating on primitive data types.

Figure 1:
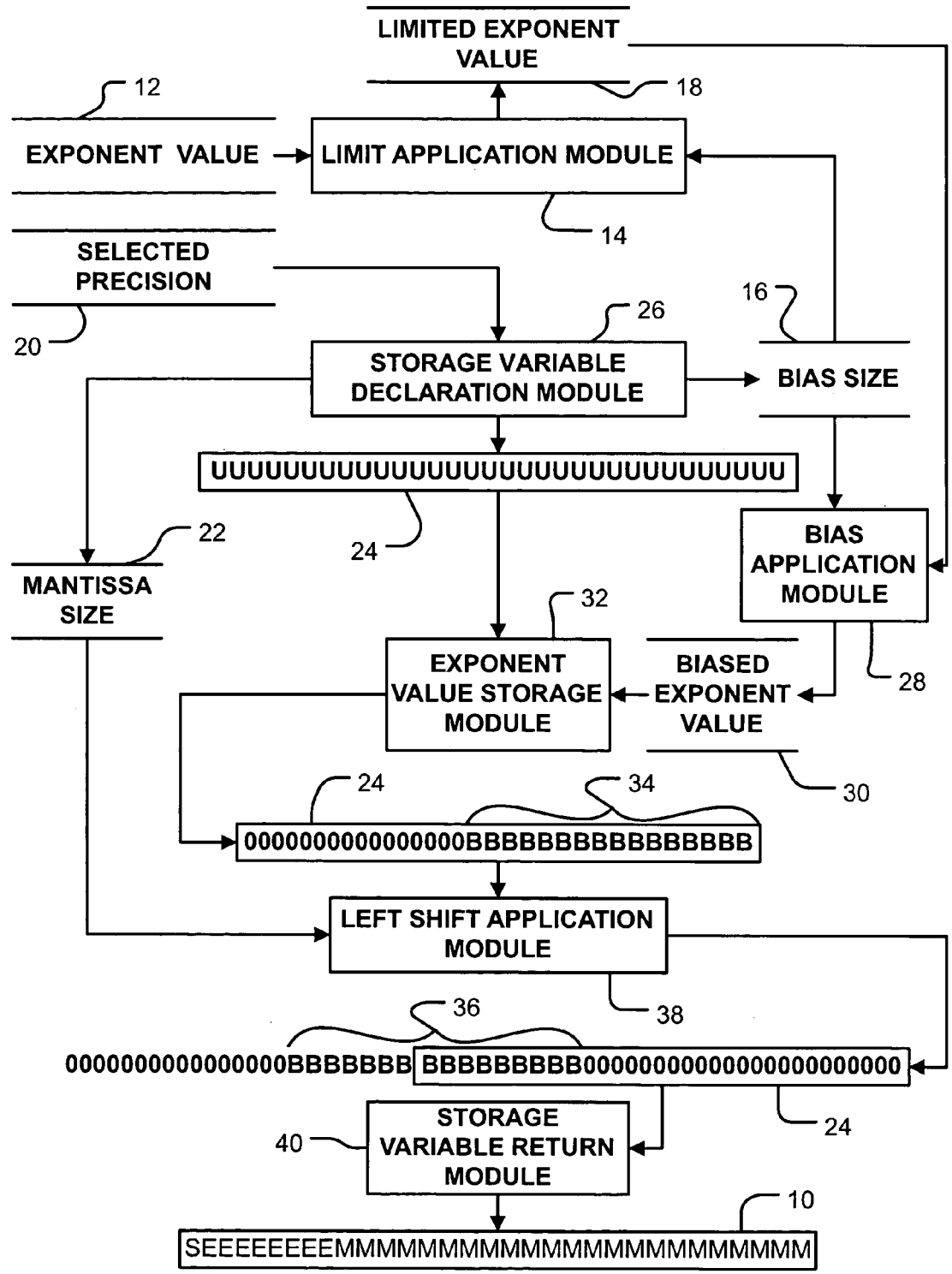
FIG. 1 is a block diagram illustrating the computing system according to the present invention.

The characteristics of one example of a floating point data type are illustrated in FIG. 1 as single precision float 10. Therein the thirty-two bit single precision float 10 includes twenty-three mantissa bits M disposed to the right of eight exponent bits E, which are similarly disposed to the right of a single sign bit S. Underlying functions in various software languages, such as the C software language, are adapted to treat the mantissa bits M as a scalar m of a radix r having an exponent e defined by the exponent bits E according to:

$$+/-(m*r^e).$$

The underlying functions are also adapted to sign the result according to the sign bit S. The radix r is typically defined as equal to two according to the standard, but may alternatively be defined as any number which may be passed to the underlying function as an argument or applied to the result.

The exponent e is biased to fall in a range from negative one-hundred twenty seven to one hundred twenty eight, but the high and low ends of this range are reserved to represent the special numbers zero, positive infinity, and negative infinity. The lower extreme is also reserved to govern the starting range of the mantissa. The mantissa m, also know as the significand, is typically presumed to have a leading bit equal to one, with the mantissa bits M recording the fraction or decimal points after the one. However, if the exponent equals negative one hundred twenty-seven, which is all zeros, then the mantissa is presumed to have a starting bit of zero. Another floating point data type is called a double, and it is composed of sixty-four bits, with fifty-two bits of mantissa and eleven bits of exponent having one-thousand twenty-three bias. These floating point data type arrangements allow for much greater ranges of numbers to be represented in thirty-two bits or sixty-four bits than can typically be represented in an integer format of the same length, such that decimal format is easily supported. As a result, floating point data types are desirable for use in real time data computation due to their small memory requirements and related access time compared to their high storage capacity and resulting specificity. However, numeric data types must usually be of identical type in order to operate on one another.

There are several variations of numeric data types, and one of these is the integer data type. An integer data type is typically composed of thirty-two bits like single precision float 10, but there are variations of integer data types as well. For example, some integer data types may be composed of sixty-four bits like a double precision float. Also, other integer data types may be composed of sixteen bits. The appellations "short" and "long" may be used variously to refer to integer data types according to conventions imposed by a particular programming language. For purposes of clarity, integer data types are referred to herein according to bit storage capacity.

In most computer languages, predefined and custom functions alike typically operate on one or more defined data types. It is therefore necessary to pass an argument of a supported data type to a function, which may require recasting the data type as another data type. Some functions are set up to automatically recast certain data types as needed. However the cost of recasting one data type as another data type varies, and some recasting procedures are extremely computationally expensive compared to others. For example, it is not particularly expensive to recast a sixteen bit integer as a thirty-two bit integer since it is only necessary to add sixteen zeros to the left side of the sixteen bit integer. However, many binary arithmetic calculations are required to recast an integer as a float, and the present invention calculates the exponent bits E of the float 10 while avoiding the necessity of recasting an integer as a float.

The system according to the present invention preferably receives the exponent value 12 as a two byte word, or sixteen-bit integer. It is envisioned, however, that the exponent value may be received in other forms in accordance with the present invention. For example, it is possible to receive the exponent value as a thirty-two bit integer or even a sixty-four bit integer. Also, an inexpensive recast may be employed.

The received exponent value, which is preferably received as an argument through an input of a software module embodying the system, is then limited by limit application module 14 based on a bias size 16. Magnitude of bias size 16 may vary based on the precision of the float 10 to be returned by an output of the system. For example, the bias for a single precision floating point data type is typically one-hundred twenty-seven. This bias accommodates a range of negative one-hundred twenty-six to positive one-hundred twenty-seven while preserving the extreme values for use in marking special cases as described above. Also, the bias for a double precision floating point data type is one-thousand twenty-three. This bias accommodates a range of negative one-thousand twenty-two to positive one-thousand twenty-three.

Limit application module 14 applies the bias size to limit the exponent value 12 so that it falls with in the range accommodated according to the precision of the floating point data type. For example, if a single precision floating point data type is to be returned, then module 14 determines whether value 12 exceeds one-hundred twenty-seven. If so, then module 14 sets value 12 equal to one-hundred twenty-seven. Similarly, module 14 determines whether value 12 falls below negative one-hundred twenty-six. If so, module 14 sets value 12 equal to negative one-hundred twenty-six. A similar limiting technique applies in the case of a double precision float, but is based on use of the bias for that data type. As a result of applying bias size 16 to limit value 12, module 14 generates a limited exponent value 18 that falls within a range accommodated by the floating point data type of selected precision 20.

Selected precision 20 may be received as an argument each time the software module embodying the system is called by a parent application. If so, bias size 16, mantissa size 22, and a size of storage variable 24 generated by storage variable declaration module 26 may be determined on the fly by module 26. Alternatively, selected precision 20 may be determined at system design time, and the system thus designed with a static rather than dynamic bias size 16, mantissa size 22, and size of storage variable 24.

Limited exponent value 18 is further altered by bias application module 28 according to bias size 16 so that the exponent value may be interpreted properly by an underlying function governing floating point data types. In particular, module 28 adds bias size 16 to limited exponent value 18. Thus, an integer value of negative one-hundred twenty-six in the case of a single precision floating point data type is converted by module 28 to one. Similarly, an integer value of one-hundred twenty-seven is converted to two-hundred fifty five. These numbers may be expressed in binary form with eight bits of data. If placed in the exponent region of a single precision floating point data type, these number will be properly interpreted as negative one-hundred twenty-six and one-hundred twenty-seven, respectively. Similar procedures attain similar results with a bias size 16 for double precision.

In order to facilitate placing the biased exponent value 30 generated by module 28 in an exponent region of a floating point data type, storage variable declaration module 26 declares a union of an integer data type and a floating point data type. For example, if single precision is desired, then module 26 declares a union of a thirty-two bit integer and a float, and the resulting storage variable 24 is thirty-two bits in length. Also, if double precision is desired, then module 26 declares a union of a sixty-four bit integer and a double. The C programming language, for example, supports union declaration functionality, and the resulting storage location may be directly manipulated by functions which take either of an integer data type and a floating point data type. Also, the resulting storage variable may be returned to a function that takes either of an integer data type and a floating point data type as a return value. Those skilled in the art may recognize other languages that support equivalent functionality.

The biased exponent value 30 is initially placed in the floating point data type by exponent value storage module 32, which places value 30 in what will become a mantissa region of storage variable 24. Value 30 is preferably automatically recast by module 32 from a sixteen bit integer to a thirty-two bit integer during the storage process. This recast is made possible because storage variable 24 may be treated as an integer, and not just as a float. Therefore, value 30 is successfully stored in variable 24 with the value preserved in integer form in bits B as at 34.

The biased exponent value is then moved into what will become the exponent region of the returned float 10 as at 36 by left shift application module 38. Module 38 performs a left shift function on storage variable 24 to shift the variable contents left by a number of bits corresponding to mantissa size 22. For example, in the case of single precision module 38 shifts the contents left by twenty-three bits. Also, in the case of double precision module 38 shifts the contents left by fifty-two bits. One skilled in the art will readily recognize that a left shift function may be accomplished in a programming environment not explicitly providing a left shift function by multiplying variable 24 as an integer by another integer selected to produce the left shift result. Such an integer may be the result of two to the twenty third power for single precision or two to the fifty-second power for double precision. One skilled in the art will recognize that these results conform in binary integer format to a one followed by either twenty-three or fifty-two zeroes.

Following the left shift of storage variable 24, storage variable return module 40 returns the storage variable 24 to the parent application, which is adapted to treat the returned variable as a floating point data type of the selected precision 20. It is envisioned that the parent application may be adapted to multiply a control variable stored as a floating point data type by the returned float 10. It should be readily appreciated that the shift left fills the mantissa region of float 10 with zeros, so that the mantissa is set equal to one in accordance with the present invention. However, it should also be readily appreciated that the system according to the present invention may be adapted to receive an argument specifying a mantissa. In such a variation, the mantissa value may be added to the storage variable as an integer immediately following the left shift. It is envisioned that the exponent value may be shifted left without first being placed in the storage variable. For example, the exponent value may be received in the form of a thirty-two or sixty-four bit integer, limited, biased, shifted left, and then placed in the storage variable. It should further be readily appreciated that module 40 may be adapted to return storage variable 24 specifically as a floating point data type of the selected precision 20, and not as a union of two data types.

Figure 2:
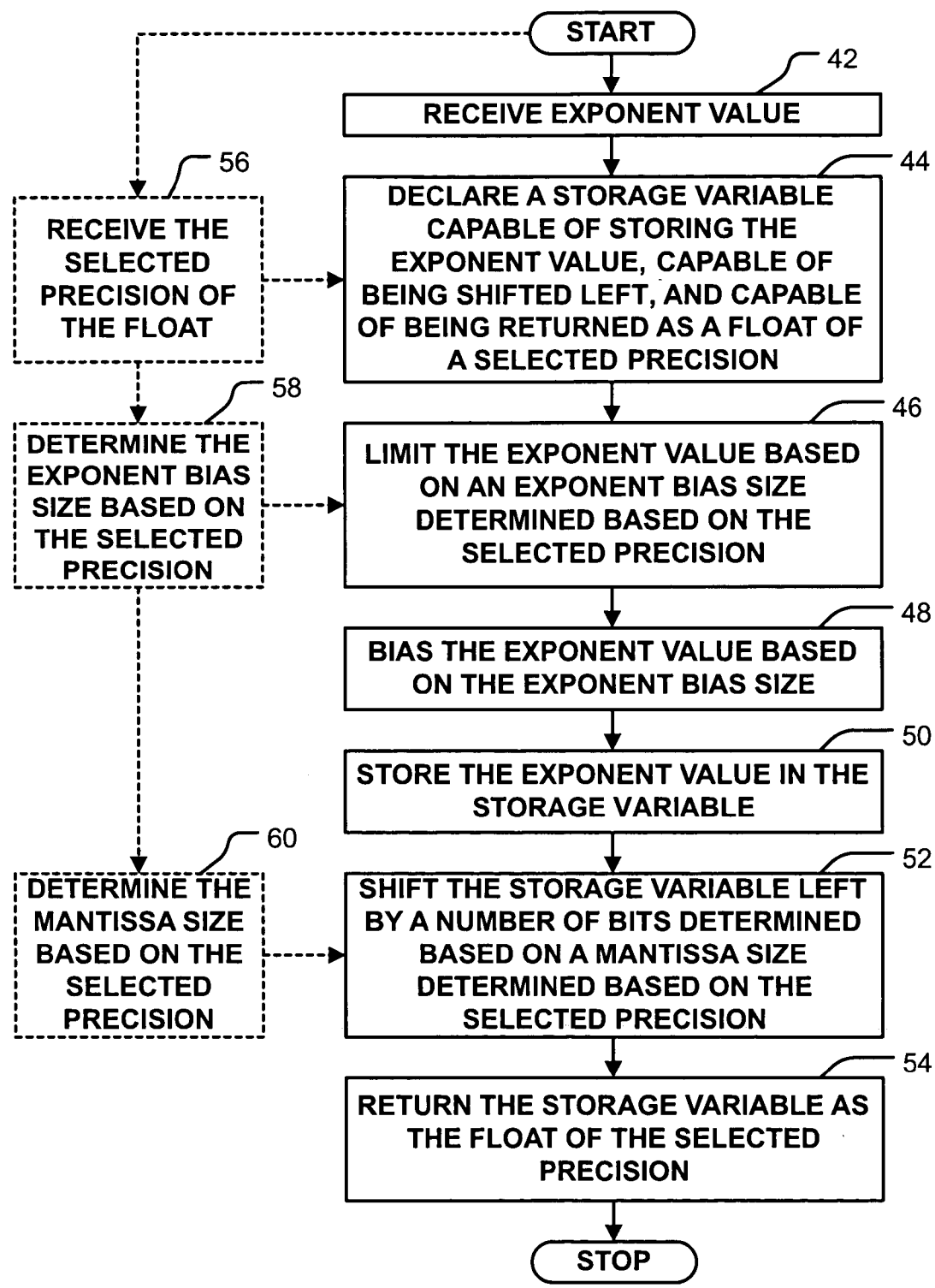
FIG. 2 is a flow diagram depicting the computing method according to the present invention.

Turning now to FIG. 2, the computational method according to the present invention proceeds with receipt of an exponent value at step 42, preferably as an integer data type. A storage variable is then declared at step 44, and this storage variable has many capabilities. For example, it is capable of storing the exponent value in integer form. It is also capable of being left shifted. It is further capable of being returned as a floating point data type without being recast as a floating point data type. Preferably, a union of an integer data type and a floating point data type is declared as supported by the C programming language. This union data type is declared at an appropriate size according to the precision of the floating point data type to be returned. For example, the storage variable is thirty-two bits in length for a single precision floating point data type, and sixty-four bits in length for a double precision floating point data type.

The exponent value is limited at step 46 and biased at step 48 before being stored in the storage variable as an integer at step 50. Limiting at step 46 is performed based on a bias size determined from the selected precision that specifies an accommodated exponent value range. This limiting at step 46 ensures that the exponent value falls within a range supported by the floating point data type of the selected precision. Accordingly, limiting ensures that the value does not correspond to a specially reserved value represented in the exponent but not falling within the accommodated range. In turn, biasing the limited exponent value at step 48 based on the bias size ensures that the exponent will be properly interpreted when placed within an exponent region of a floating point data type without being recast from an integer to a float. Storing the biased value in the storage variable as an integer at step 50 temporarily places the exponent value in what will be a mantissa region of the returned floating point data type.

The contents of the storage variable are shifted left at step 52 by a number of bits sufficient to move the exponent value past what will be the mantissa region and into what will be the exponent region of the returned floating point data type. Thus, a mantissa size determined based on the selected precision is employed to govern the left shift function. It is envisioned that the exponent value may be shifted left without first being placed in the storage variable. For example, the exponent value may be received in the form of a thirty-two or sixty-four bit integer, limited, biased, shifted left, and then placed in the storage variable. Finally, the storage variable is returned as a floating point data type of the selected precision at step 54. It should be readily understood that the size of the storage variable, the limits applied to the exponent value, the bias added to the exponent value, and the number of bits by which to left shift the storage variable may all be determined at design time. Alternatively, the selected precision of the float to be returned may be received as an argument at step 56. In this case, the size of the storage variable, the limits applied to the exponent value, the bias added to the exponent value, and the number of bits by which to left shift the storage variable may all be determined dynamically at steps 44, 58, and 60, respectively.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A computing system that includes a computer-readable medium and calculates an exponent portion of a floating point data type, for use in calculating powers of two in a computer language processing environment supporting a union declaration functionality and a left shift functionality, comprising:
   an input receptive of an exponent value;
   a bias application module that biases the exponent value based on a selected precision of a floating point data type;
   a storage module that stores the biased exponent value in a storage of the computer-readable medium having a size determined based on the selected precision;
   a left shift application module that shifts the biased exponent value left by a number of bits determined based on the selected precision; and
   an output module that outputs the biased exponent value from the storage as the floating point data type having the selected precision.

2. The system of claim 1 wherein the storage can store an integer data type and a float data type.

3. The system of claim 2 wherein the selected precision is single, and the storage can store a thirty-two bit integer data type and a single precision floating point data type.

4. The system of claim 2 wherein the selected precision is double, and the storage can store a sixty-four bit integer data type and a double precision floating point data type.

5. The system of claim 2 wherein said input is further receptive of the selected precision, said storage variable declaration module determines a bias size, a mantissa size, and the size of the storage variable based on the selected precision, said bias application module biases the exponent value based on the bias size, and said left shift application module shifts the storage variable left based on the mantissa size.

6. The system of claim 1 further comprising a limit application module that limits the exponent value based on an exponent value range determined based on the selected precision.

7. The system of claim 6 wherein the selected precision is single, and said limit application module determines whether the exponent value at least one of exceeds one-hundred twenty-seven and falls below negative one-hundred twenty-six, and to set the exponent value equal to at least one of one-hundred twenty-seven and negative one-hundred twenty-six when the exponent value respectively at least one of exceeds one-hundred twenty-seven and falls below negative one-hundred twenty-six.

8. The system of claim 6 wherein the selected precision is double, and said limit application module determines whether the exponent value at least one of exceeds one-thousand twenty-four and falls below negative one-thousand twenty-three, and to set the exponent value equal to at least one of one-thousand twenty-four and negative one-thousand twenty-three when the exponent value respectively at least one of exceeds one-thousand twenty-four and falls below negative one-thousand twenty-three.

9. The system of claim 1 wherein the selected precision is single, and said bias application module adds one-hundred twenty seven to the exponent value.

10. The system of claim 1 wherein the selected precision is double, and said bias application module adds one-thousand twenty-three to the exponent value.

11. A computing method for calculating an exponent portion of a floating point data type, for use in calculating powers of two in a computer language processing environment supporting a union declaration functionality and a shift left functionality, comprising:
receiving an exponent value;
biasing the exponent value based on a selected precision of a floating point data type;
storing the biased exponent value in a storage of a computer-readable medium, said storage having a size determined based on the selected precision;
shifting the biased exponent value left by a number of bits determined based on the selected precision; and
outputting the biased exponent value from the storage as the floating point data type having the selected precision.

12. The method of claim 11 wherein the storage can store an integer data type and a float data type.

13. The method of claim 12 wherein the selected precision is single, and the storage can store a thirty-two bit integer data type and a single precision floating point data type.

14. The method of claim 12 wherein the selected precision is double, and the storage can store a sixty-four bit integer data type and a double precision floating point data type.

15. The method of claim 11 further comprising limiting the exponent value based on an exponent value range determined based on the selected precision.

16. The method of claim 15 wherein the selected precision is single, and said limiting includes:
determining whether the exponent value at least one of exceeds one-hundred twenty-seven and falls below negative one-hundred twenty-six; and
setting the exponent value equal to at least one of one-hundred twenty-seven and negative one-hundred twenty-six when the exponent value respectively at least one of exceeds one-hundred twenty-seven and falls below negative one-hundred twenty-six.

17. The method of claim 15 wherein the selected precision is double, and said limiting includes:
determining whether the exponent value at least one of exceeds one-thousand twenty-four and falls below negative one-thousand twenty-three; and
setting the exponent value equal to at least one of one-thousand twenty-four and negative one-thousand twenty-three when the exponent value respectively at least one of exceeds one-thousand twenty-four and falls below negative one-thousand twenty-three.

18. The method of claim 11 wherein the selected precision is single, and said biasing includes adding one-hundred twenty seven to the exponent value.

19. The method of claim 11 wherein the selected precision is double, and said biasing includes adding one-thousand twenty-three to the exponent value.

20. The method of claim 11 further comprising:
receiving the selected precision; and
determining a bias size, a mantissa size, and the size of the storage based on the selected precision, wherein said biasing is based on the bias size and said shifting is based on the mantissa size.

* * * * *